US 6,539,663 B2

(12) United States Patent
Mosher

(10) Patent No.: US 6,539,663 B2
(45) Date of Patent: Apr. 1, 2003

(54) HUMANE WILD ANIMAL TRAP

(76) Inventor: Ross E. Mosher, 7838 Kisling Rd., Redding, CA (US) 96002

( * ) Notice: Subject to any disclaimer, the term of this patent is extended or adjusted under 35 U.S.C. 154(b) by 13 days.

(21) Appl. No.: 09/738,299

(22) Filed: Dec. 14, 2000

(65) Prior Publication Data

US 2001/0047611 A1 Dec. 6, 2001

Related U.S. Application Data

(60) Provisional application No. 60/166,325, filed on Dec. 30, 1999.

(51) Int. Cl.$^7$ .............................................. A01M 23/02
(52) U.S. Cl. ................................................ 43/61; 43/58
(58) Field of Search ............................ 43/58, 60, 61, 43/105, 78, 121, 67

(56) References Cited

U.S. PATENT DOCUMENTS

| | | | | |
|---|---|---|---|---|
| 1,630,798 A | * | 5/1927 | Morelli | |
| 2,412,518 A | * | 12/1946 | Krelwitz | |
| 2,803,918 A | * | 8/1957 | Hall | |
| 4,232,472 A | * | 11/1980 | Muelling | 43/61 |
| 4,462,181 A | * | 7/1984 | Broman | 43/61 |
| 4,594,804 A | * | 6/1986 | Misko | 43/105 |
| 4,612,723 A | * | 9/1986 | Reed | 43/61 |
| 4,682,440 A | * | 7/1987 | Hunter | 43/61 |
| 4,766,692 A | * | 8/1988 | Shurden | 43/78 |
| 5,148,625 A | * | 9/1992 | Saleman | 43/121 |

FOREIGN PATENT DOCUMENTS

| | | | | |
|---|---|---|---|---|
| GB | 2230930 A | * | 11/1990 | A01M/23/02 |

* cited by examiner

*Primary Examiner*—Kurt Rowan
*Assistant Examiner*—Bethany L. Griles
(74) *Attorney, Agent, or Firm*—John J. Leavitt

(57) ABSTRACT

Presented is a humane wild animal trap device that includes a trigger mechanism having four easily assemblable elements for supporting the bait, a bottom flat sheet on which the trigger mechanism is supported when set and baited, and an enclosure the open side of which is superimposed on the flat bottom sheet and which enclosure is tilted upwardly from one end so that the elevated end rests on a selected one of the four elements included in the trigger mechanism and which element is released from a second element that supports the bait when a wild animal takes the bait, thus causing the elevated enclosure to fall onto the flat bottom sheet to trap the wild animal within the enclosure. The four elements of the trigger mechanism are interrelated in such a manner that two of the elements support the trigger mechanism while the other two elements are pivotally interengaged with one of the support elements and are releasably interengaged one with the other to support the tilted enclosure and the bait and to set the trap so that the enclosure falls when the bait is taken.

10 Claims, 2 Drawing Sheets

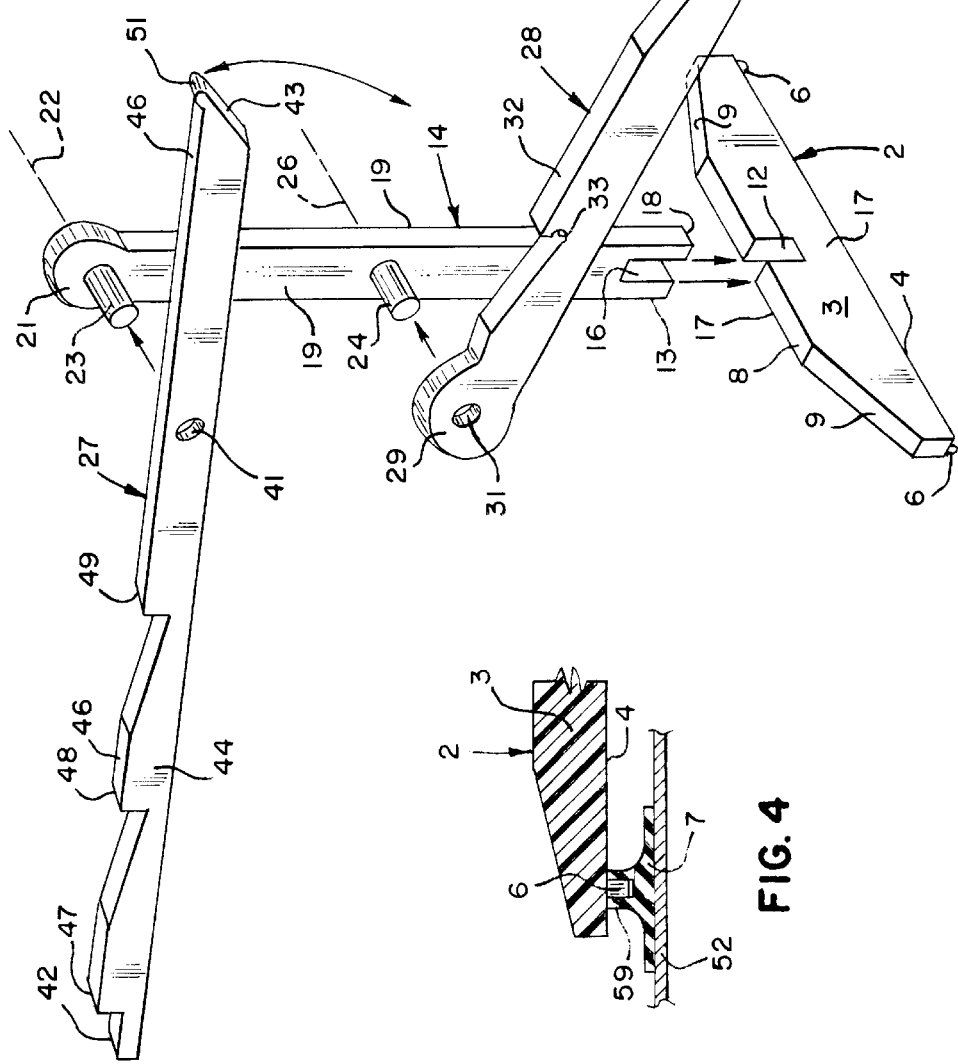

HUMANE WILD ANIMAL TRAP

This application claims the benefit of provisional application No. 60/166,325, filed Dec. 30, 1999.

BACKGROUND OF THE INVENTION

1. Field of the Invention

This invention relates to wild animal traps, and particularly to such a trap that lures and entraps a wild animal without doing harm to the wild animal, i.e. without killing or maiming the wild animal, while restraining the wild animal pending delivery and release of the wild animal to its natural habitat.

2. Description of the Prior Art

A diligent search through commercial retail outlets where one would expect to find traps for wild animals has failed to disclose traps of the type that capture a wild animal but do not maim or kill the wild animal. Such traps as have been found include snares that are designed to choke to death the animal that is snared, or to maim it to the point that it remains defenseless against the forces of nature and disease, or lies trapped and defenseless against its own kind or other predators. Other traps are designed to kill outright any animal, even domestic animals, that have the misfortune of triggering the trap mechanism.

Accordingly, the principal object of the present invention is to provide a trap device that is effective to trap and restrain a wild animal that triggers the trap, but which does not physically injure or maim or kill the trapped animal, whether it be a wild animal such as a rat, a racoon, a possum, or squirrel, thus enabling humane disposition of the still alive wild animal back into its natural habitat.

Another object of the invention is the provision of a trap device for wild animals that will effectively lure the animals with bait of the type they are prone to seek, and which, upon taking the bait, trigger the trap device so as to dispose about the wild animal an enclosure from which they cannot escape but which does no physical harm to the entrapped animal.

A still further object of the invention is the provision of a wild animal trap that is inexpensive to manufacture, simple to implement or set, and which may be cooperatively utilized with most types of enclosures that are readily available in most households, such as cardboard boxes, wire baskets, or containers of the type distributed by many municipalities for collecting recyclable materials.

Yet another object of the invention is the convenient placement of the trap device on a flat pan, such as a cookie sheet, or other flat, preferably metallic sheet, that will cooperate with the enclosure that is dropped onto the flat pan to prevent the inadvertent escape of the trapped animal and which will facilitate picking up the entire assembly for transport to the natural habitat of the wild animal, where it may be released to reenter its natural habitat and maintain the balance of the ecosystem from whence it came.

Traps for wild animals are prone to pick up the scent of the wild animal that it comes in contact with the trap mechanism. The retention of such scent on the trap mechanism or device may prevent the approach of another wild animal to investigate and take the bait. Accordingly, another object of the invention is the provision of a wild animal trap that is conveniently fabricated from synthetic resinous material or metal and which may easily be cleaned and washed to remove a human scent or the scent of any other animal.

The invention possesses other objects and features of advantage, some of which, with the foregoing are illustrated and described in the drawings and specification that follow. It is to be understood however that the invention is not limited to the embodiment illustrated and described since it may be embodied in various forms within the scope of the appended claims.

SUMMARY OF THE INVENTION

In terms of broad inclusion, the humane wild animal trap device of the invention includes a trigger mechanism which comprises four easily assemblable elements for supporting the bait, a bottom flat sheet on which the trigger mechanism is supported when set and baited, and an enclosure the open side of which is superimposed on the flat bottom sheet and which enclosure is tilted upwardly from one end so that the elevated end rests on a selected one of the four elements that comprise the trigger mechanism and which element is released from a second element that supports the bait when a wild animal takes the bait, thus causing the elevated enclosure to fall onto the flat bottom sheet to trap the wild animal within the enclosure. The four elements of the trigger mechanism are interrelated in such a manner that two of the elements support the trigger mechanism while the other two elements are pivotally interengaged with one of the support elements and are releasably interengaged one with the other to support the tilted enclosure and the bait and to set the trap so that the enclosure falls when the bait is taken.

BRIEF DESCRIPTION OF THE DRAWINGS

FIG. 3 is a perspective view of the separate elements of the trap mechanism shown in exploded relationship to one another to better illustrate the manner of assembly, and shown apart from the flat bottom sheet and the enclosure.

FIG. 4 is a fragmentary view, partly in vertical section, illustrating an alternative manner of supporting the base element of the trap trigger mechanism on a flat support sheet through use of suction cups.

DESCRIPTION OF PREFERRED EMBODIMENT

Figure 1:
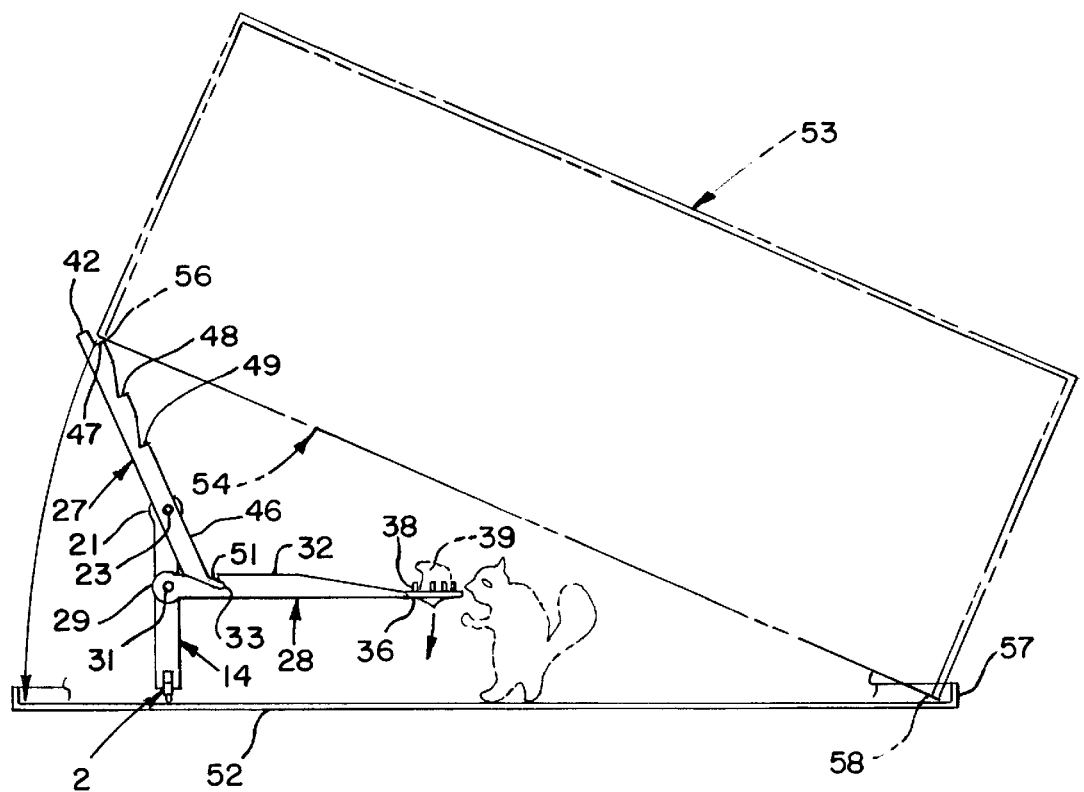
FIG. 1 is a side elevational view illustrating the trap device assembled and set to support the bait and the tilted enclosure so that the trap releases the tilted enclosure when the bait is taken by the wild animal.
Figure 2:
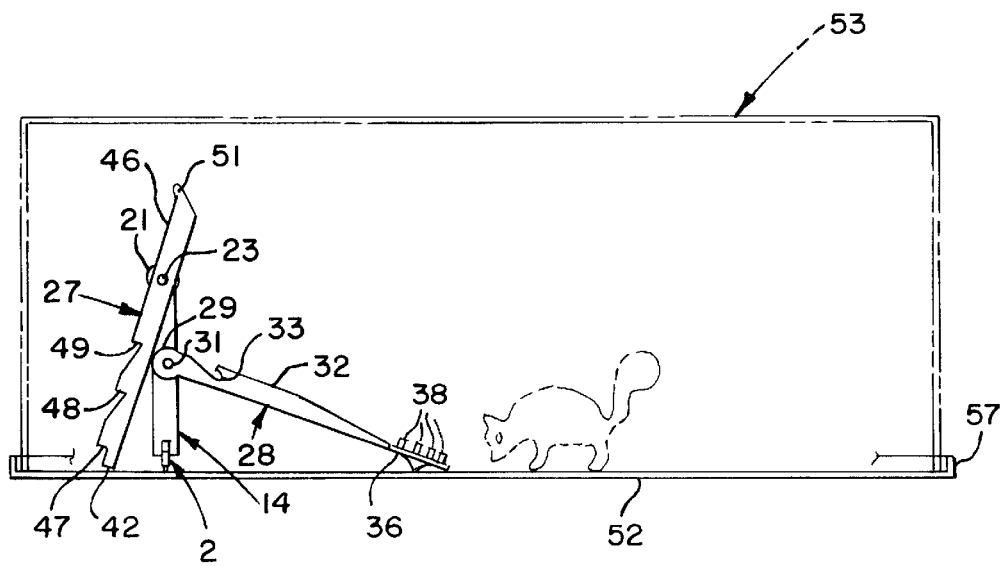
FIG. 2 is a side elevational view illustrating the trap device after the bait has been taken and the enclosure released to entrap the wild animal. In the interest of clarity, the enclosure is illustrated in broken lines.

In terms of greater detail, and referring first to FIG. 3, it will there be seen that the trap trigger mechanism comprises an elongated base member designated generally by the numeral 2, conveniently formed from synthetic resinous material, wood, or metal, and having a body 3, provided with a lower edge 4 adjacent opposite ends of which are secured cylindrical projections 6 which support the body 3 when placed on an uneven support surface. Alternatively, the projections 6 may be utilized to attach a pair of conventional suction cups 7 to the underside or lower edge 4 of the body 3. The suction cups may be utilized to releasably attach the body 3 to a support surface such as illustrated in FIGS. 1, 2 and 4, and which will hereinafter be described and explained.

The body 3 is formed on its top edge 8 with tapered portions 9 which minimize the height of the body at its opposite extremities so as to minimize the ends of the body constituting an obstacle over which or about which a wild animal must pass in order to reach the bait that has lured it into close proximity to the trap mechanism. Also formed medianly in the top edge 8 of the body 3 is a notch 12, generally rectangular in its configuration and sized to slidably and releasably receive the end portion 13 of a vertically oriented post designated generally by the numeral 14 and conveniently fabricated from the same material as the base member 2.

The end portion 13 of the post is provided with a slot 16 sized and configured to be received in the slot 12 formed in the top edge of the body so that the end portions 13 of the post that define the slot 16 slip tightly but releasably over the opposed side surfaces 17 of the body until the bottom surfaces of the two slots 12 and 16 abut, whereupon the slotted end edge 18 of the post 14 is substantially flush with the lower edge 4 of the body 3 and the sides of the slot 12 tightly abut the side surfaces 19 of the post 14 above the slot 16. It will thus be seen that the base member and post may be manufactured as separate elements and packaged and shipped in a knocked-down or "kit" condition to save space and shipping costs and to enable assembly by the purchaser.

Still referring to FIG. 3, it will be seen that the post 14 is itself elongated, generally rectangular in cross-section but not necessarily so, and when tightly but releasably attached to the base member as described above, it projects at right angles to or perpendicularly in relation to the base member 2, terminating in a top end portion 21 which is conveniently circularly rounded about a transverse axis 22 that forms the rotational center of the rounded top end portion 21. A cylindrical pivot pin 23 is fixed to the rounded top end portion 21 so that it projects perpendicularly therfrom coincident with the axis 22. The pivot pin, while extending perpendicularly from the surface 19 of the post 14, lies generally in the same plane as the base member when the post 14 is releasably secured to the body 3.

A second pivot pin 24 is fixed to the post 14 spaced generally medianly along the length of the post and therefore spaced below the first pivot pin 23 and projecting in the same direction as the first pivot pin, i.e., perpendicular to the surface 19 of the post and lying in the same plane as the elongated base member 2 when the post is attached to the base member in the manner illustrated in FIG. 4. The second pivot pin is also cylindrical, being symmetrical about a central rotational axis 26 as illustrated in FIG. 3, the rotational axes 22 and 26 of the pivot pins 23 and 24 being parallel to one another and extend perpendicular to the longitudinal axis of the post 14.

The pivot pins 23 and 24 rotationally, i.e., pivotally, support, respectively, an upper support beam designated generally by the numeral 27 and a lower support beam designated generally by the numeral 28. These beams are categorized as "support" beams for the reason that they function cooperatively and selectively to support different things for different purposes as will hereinafter be explained.

Referring first to the lower support beam 28 as seen in FIG. 3, it wil be seen that this beam is elongated, generally rectangular in cross-section and provided at one end with a rounded pivot portion 29 having a pivot aperture 31 therein to pivotally accommodate the lower pivot pin 24. The lower support beam 28, when mounted on the pivot pin 24, may then freely rotate on the pivot pin 24 about the rotational axis 26. At a point spaced from the rotational axis of the pivot portion 29 the upper edge 32 of the lower support beam is provided with a notch 33 that opens toward the pivotal axis of the lower support beam. At its end portion 34 remote from the rounded pivot portion 29, the lower support beam is provided with a platform 36 fixed to the end of the beam.

The upper surface 37 of the platform is provided with upwardly projecting fastener pins 38 adapted to receive and retain on the surface of the platform a quantity of bait 39 as illustrated in FIG. 1.

Referring now to upper support beam 27 as illustrated in the drawings, and referring specifically to FIG. 3, it will be seen that the upper support beam is also elongated, generally rectangular in cross-section, and preferably fabricated from the same material as the base member and the lower support beam 28. The upper support beam is provided with an aperture or bore 41 extending transversely of the beam and positioned intermediate its left and right ends 42 and 43, respectively. The bore 41 is sized to rotationally, i.e., pivotally, receive the upper pivot pin 23 therethrough so as to enable pivotal movement of the upper beam freely about the rotational axis of the upper pivot pin 23.

At its left end portion 44 as seen in FIG. 3, the upper edge 46 of the upper support beam is provided with three shoulders 47, 48 and 49, the shoulder 47 being adjacent the end edge 42 of the beam, while the shoulders 48 and 49 are spaced along the top edge 46 as illustrated to provide a measure of adjustment as will be explained hereinafter. At its right end 43, the top edge 46 of the upper beam is provided with a projection 51 that projects above the surface 46 of the upper beam and is shaped, e.g., rounded, and sized at its distal end to slip smoothly and securely into the notch 33 formed in the top edge 32 of the lower support beam for a purpose which will now be explained.

After the structure described above has been assembled in the manner indicated by the arrows in FIG. 3, by first mounting the post 14 on the base member 2, then mounting the upper support arm on the pivot pin 23, then mounting the lower support arm on the pivot pin 24, and placement of the bait on the platform 36, the upper support arm is pivoted clockwise to place the projection 51 in close proximity opposite the notch 33 in the lower support beam. The lower support beam is then pivoted counterclockwise to engage the projection 51 in the notch 33. The entire assembly is then placed on a flat surface such as on the top surface of the flanged sheet 52 illustrated in FIGS. 1 and 2. The trap assembly, thus set and supported on the flanged sheet 52 next has superimposed over it a container 53, such as a cardboard box or wire basket the open lower side 54 of which faces the flanged sheet 52, while one open end edge 56 of the container remote from the trap assembly rests on the flanged sheet and abuts the flange 57 at the associated end of the sheet. The opposite and corresponding open end edge 58 of the container is brought to rest on the first shoulder 47 as shown in FIG. 1, or selectively on one or the other of the shoulders 48 or 49, so as to adjust the height of the opening below the open end edge 58.

Thus arranged, it will be understood that the weight of the container imposes a downward thrust on the shoulder 47 in the direction of the arrow, thus imposing a rotary moment on the upper support beam tending to rotate the beam counterclockwise. Since the upper beam 27 is pivoted on the pivot pin 23, and since the projection 51 on the end 43 of the upper beam is engaged in the notch 33 formed in the lower support beam, it will be understood that such counterclockwise-imposed rotary moment on the upper support beam retains the projection 51 locked in the notch 33, and tends to pivot the lower support beam 28 counterclockwise about the pivot pin 24. However, because of the lengths of the beam portions measured between their respective axes of rotation and the point of their interengagement (51/33), the counterclockwise rotary moment imposed on the lower support beam by the upper support beam resulting from the downward pressure imposed on the upper support beam by the weight of the container merely imposes an axially directed force on the upper support beam toward the pivot pin 23 without effecting any rotation of either of the two interlocked upper and lower support beams.

Thus, as seen in FIG. 2, it requires a downward pressure on the distal bait-supporting end of the lower support beam, as by pressure imposed by a wild animal taking the bait, or attempting to take the bait, that presses the distal (right) end of the lower support beam downwardly, causing it to pivot clockwise and as a consequence disengage the projection 51 on the right end of the upper support beam from the notch 33 formed in the lower support beam, resulting in the weight of the container causing the upper support beam to pivot counterclockwise (FIG. 2) thus resulting in the container being caused to fall rapidly into the position illustrated in FIG. 2, thus surrounding the wild animal and preventing its escape. The flat flanged sheet on which the open end of the container rests cooperates with the container to retain the wild animal trapped, whereupon the flat flanged sheet and the container may be picked up and transported to a place where the wild animal may be released into its natural habitat.

In FIG. 4 there is shown an alternative manner of temporarily and releasably securing the base member 2 to the top surface of the flat flanged sheet. As there shown, each of the projections 6 is utilized to engage the mounting portion 59 of suction cup 7 that is in turn releasably caused to adhere to the top surface of the flat flanged sheet 52. It should be understood however that in the absence of the flat flanged sheet, the base member 2 with projections 6 extending therefrom, may be placed on the surface of the ground or on a grassy surface, the projections 6 aiding in the support of the base member on an irregular surface. In this event, i.e., when the flat flanged sheet is not used, it is necessary to insert some type of flat sheet under the open side of the container within which the animal is trapped to enable restraint of the animal within the enclosure during transport.

Having thus described the invention, what is believed to be new and novel and sought to be protected by letters patent of the United States is as defined in the following claims.

I claim:

1. A humane animal trap comprising, in combination, a trap trigger mechanism and an enclosure in cooperative association with said trap trigger mechanism for restraining a wild animal when the trap trigger mechanism is triggered by a wild animal; said trap trigger mechanism including;
    a) a base member for supporting the trap trigger mechanism on a supporting surface;
    b) an elongated post member releasably attached to said base member and extending upwardly therefrom, said post member having mounted therealong spaced upper and lower pivot pins;
    c) an elongated lower support beam pivotally mounted on- the elongated post member on said lower pivot pin and having intermediate its ends a trigger notch and adjacent one end a bait-support platform upon which bait may be placed to lure a wild animal;
    d) an elongated upper support beam pivotally mounted intermediate its opposite ends on the elongated post member on said upper pivot pin and having at least one shoulder thereon adjacent one end thereof and a trigger projection on its opposite end, said trigger projection being selectively engageable with said trigger notch in said lower elongated support beam to "set" the trap; and
    e) said enclosure having an open side superimposed over and facing said trap trigger mechanism and having one end thereof supported in elevated position on said at least one shoulder on said elongated upper support beam and the other end supported on the surface on which said base member is supported, whereby when a wild animal takes the bait said lower elongated support beam is pivoted clockwise and said trigger projection is disengaged from said trigger notch and said upper support beam is pivoted counterclockwise under the weight of said enclosure whereby the open side of said enclosure comes to rest on the support surface to entrap and restrain the animal therewithin.

2. The combination according to claim 1, wherein said base member is elongated and includes a mounting notch formed medianly therealong for releasably receiving and tightly retaining one end of said elongated post member.

3. The combination according to claim 2, wherein said elongated post member is provided with a notch in the end thereof cooperating with the notch in the base member to releasably and tightly engage said base member.

4. The combination according to claim 1, wherein said upper pivot pin is mounted on the end portion of said elongated post member remote from said base member, and said lower pivot pin is mounted on said elongated post member medianly between said upper pivot pin and the end of said elongated post member releasably yet tightly attached to said base member.

5. The combination according to claim 4, wherein said lower elongated support beam is pivoted by one end portion thereof to said lower pivot pin, and a trigger notch is provided in said elongated lower support beam intermediate its opposite ends.

6. The combination according to claim 5, wherein said upper elongated support beam is pivoted intermediate its opposite ends on said upper pivot pin, said at least one shoulder is formed on said upper support beam on one side of said pivot pin, and a trigger projection is formed on the end of said upper support beam on the other side of said pivot pin, whereby said trigger projection may selectively be engaged with the trigger notch formed in said lower support beam to "set" the trap trigger mechanism.

7. The combination according to claim 6, wherein said enclosure resting on said at least one shoulder on said elongated upper support beam imposes a counterclockwise rotational moment on said elongated upper support beam which when one end thereof is engaged with said lower support beam in turn imposes a counterclockwise rotary moment on said lower support beam to support said trigger mechanism and said bait in trap "set" condition, whereby when an animal takes the bait said lower elongated support beam is pivoted clockwise to disengage the elongated upper support beam from the elongated lower support beam to cause the elongated upper support beam to pivot counterclockwise and drop the open side of the enclosure about the animal that took the bait.

8. The combination according to claim 1, wherein said base member is provided with suction cups attached to opposite ends thereof.

9. The combination according to claim 1, wherein a flat flanged sheet is disposed below said base member, and when said trigger mechanism is tripped by an animal taking the bait, said enclosure falls onto the flat flanged sheet so as to entrap and restrain the animal therewithin.

10. The combination according to claim 9, wherein said flat flanged sheet is provided with a smooth top surface, and said base member is provided with suction cups for selective attachment to the smooth top surface of said flat flanged sheet.

* * * * *